United States Patent
Bettinger

(10) Patent No.: US 6,801,363 B1
(45) Date of Patent: Oct. 5, 2004

(54) CONFORMABLE REFLECTIVE DISPLAY ELEMENT

(76) Inventor: David S. Bettinger, 8030 Coventry, Grosse Ile, MI (US) 48138

( * ) Notice: Subject to any disclaimer, the term of this patent is extended or adjusted under 35 U.S.C. 154(b) by 629 days.

(21) Appl. No.: 09/711,381

(22) Filed: Nov. 14, 2000

(51) Int. Cl.[7] .......................... G02B 27/14; G02C 7/10; G02C 7/16
(52) U.S. Cl. ............................. 359/631; 351/44; 351/45
(58) Field of Search .......................... 359/630, 631; 351/44, 45, 46, 47, 49, 164, 50

(56) References Cited

U.S. PATENT DOCUMENTS

| | | | | |
|---|---|---|---|---|
| 4,714,516 A | * | 12/1987 | Eichelberger et al. | ........ 216/62 |
| 4,828,380 A | * | 5/1989 | Cherian | ........................ 351/45 |
| 4,877,657 A | * | 10/1989 | Yaver | ........................... 428/31 |
| 5,928,718 A | * | 7/1999 | Dillon | .......................... 427/164 |
| 6,076,924 A | * | 6/2000 | Wysocki | ....................... 351/50 |
| 6,416,178 B1 | * | 7/2002 | Friedman | ..................... 351/163 |

* cited by examiner

*Primary Examiner*—Ricky Mack

(57) ABSTRACT

A metallized polymer adhesive film is applied and conforms to the shape of a spherical or aspheric optical surface of a lens to create a reflecting element in an imaging display. In the preferred embodiment the lens, film is mounted on the inside concave surface of a spectacle lens where it assumes the shape of the parent lens to act as a reflective optical element for a glasses mounted display.

3 Claims, 1 Drawing Sheet

CONFORMABLE REFLECTIVE DISPLAY ELEMENT

FIELD OF THE INVENTION

The present invention relates to a reflective optical element based upon a reflective film, tape, or sheet applied to an optically shaped surface. In particular, the present invention relates to a spectacle and goggle mounted display and viewer that uses an inside concave portion of a lens surface for a reflective optical element and mirror.

BACKGROUND OF THE INVENTION

Many spectacle and goggle mounted devices require at least one reflective element or mirror. Examples of such applications are glasses mounted displays and glasses mounted mirrored viewers for cyclists.

To apply a silvered or aluminized reflective surface to a small portion of an eyeglass lens for a display or viewer requires the attention of a specialized laboratory. About half of the population wears prescription glasses and would be adverse to giving them up for disassembly and further lab work to obtain a display. Sunglasses used by those with normal vision are selected for style and purchased for use without delay for laboratory work. Thus the delay and inconvenience of sending eyeglasses to a mirroring laboratory is a hindrance to making glasses mounted display devices readily available and widely acceptable.

For spectacle mounted displays with large numerals such as a digital clock, the precision and cost of masking and sputtering a protected aluminized coating onto a glasses lens surface has proven to be a costly and overly precise optical response. While an aluminized coating may provide an excellent optical image of the object, in this case four numerals, such precision of image is unnecessary for the user to be able to discern the time correctly.

SUMMARY OF THE INVENTION

In order to overcome the shortcomings of the current condition, the present invention is directed to a reflective optical element comprising a lens possessing at least one optically shaped surface a portion of which is suitable as an adhesive substrate on which is disposed a lens film comprising an adhesive layer and backing selected to maintain a uniform thickness when deformed, a metal foil and metallized polymer layer possessing a uniform light reflecting surface and of a thickness selected to be flexible when deformed, wherein said lens film is applied and secured to said lens with pressure and stress to conform to said optically shaped surface and adhere said adhesive backing to said lens substrate. Said light reflecting surface is selected and positioned within the optical train of a spectacle mounted display and viewer. In some embodiments of the present invention, the lens film is partly transparent. In the preferred embodiment of the current invention as a spectacle mounted display, the resulting image quality is suitable for the display of a limited quantity of text.

In the prior art, reflective tape was considered to be too imprecise a medium for functioning as an optical element to generate a recognizable image. Although metallized film is readily available as flat mirrors for decorative purposes, spherical, cylindrical or aspheric shapes in small sizes lens were considered unlikely to produce acceptable images for any possible application.

It is the object of this invention to provide an immediate and easy application of a reflective layer to an optical surface of a glasses or goggles mounted display.

It is also an object of this invention to provide a reflective surface of a quality that is consistent with the legibility and accuracy of simple, limited text and graphic images by a glasses or goggles mounted display such as used in a pager, cellular phone, or personal digital assistant. Personal glasses mounted displays must minimize the area they occult to maintain forward viewing. For purposes of this invention the definition of simple, limited text is taken to be fewer than 25 vertical lines of text. Such text when displayed at letter heights of 0.3 degree or greater minimizes the effects of reflective surface imperfections.

It is a further object of this invention to provide a reflective coating that can be applied under field rather than laboratory conditions.

It will be understood by one skilled in the art that protective means may be applied to the reflective metal layer to protect against scratches. Such a protective means may consist of two protecting transparent layers wherein at least one protecting layer is disposed on each face of said reflective metal layer.

It will also be understood by one skilled in the art that by the use of a transparent adhesive that the current invention can be applied to the front surface of a spectacle lens. In this case a light ray from the object will pass through the spectacle lens and the adhesive layer to be reflected back through the adhesive and the spectacle lens.

It will further be understood by one skilled in the art that a metallized film may be selected to be partly transparent to provide a forward view through the glasses as well as a reflective view of the image. In such an application a transparent adhesive such as 3M Optically Clear Laminating Adhesives 8141 and 8142 would be selected so as not to hinder forward viewing.

BRIEF DESCRIPTION OF THE DRAWINGS

Referring now to the drawings.

DETAILED DESCRIPTION OF THE INVENTION

Figure 1:
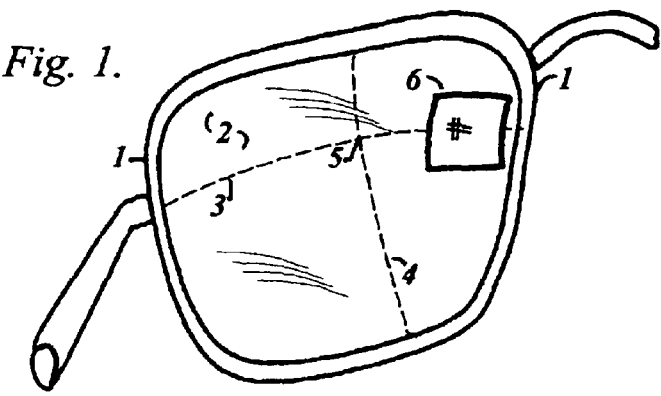
FIG. 1 is a partial perspective view of the left spectacle side in accordance with the principles of the present invention wherein the reflective film element conforms precisely to the shape and curve of the inside surface of a portion of the spectacle lens which is rendered reflective.

Referring to the Drawings, in general, FIG. 1 illustrates the left half of a spectacle frame 1 within which is mounted the left lens 2 of an eye correction or eye protection device. The spectacle lens 2 has a center of view 5 determined by horizontal axis 3 and vertical axis 4. In a preferred embodiment of the invention, lens 2 is a spherical or aspheric lens possessing a concave surface upon which is mounted on the nasal portion and quadrant a reflective lens film 6, for a glasses mounted display. Optical and electronic elements of a glasses mounted display are not considered a part of the present invention and are not shown for clarity of the present invention.

Lens film 6 is mounted on lens 2 using the adhesive layer of the film. Lens film 6 may be configured to be either permanently or, detachably mountable on lens 2 if the reflective surface is damaged and requires replacement.

Figure 2:
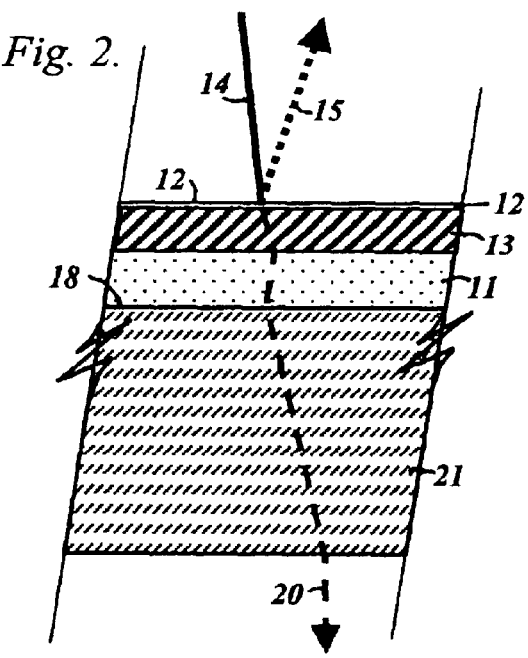
FIG. 2 is an enlarged cross-sectional view of a small portion of reflective, adhesive metal lens film mounted on an optical flat.

FIG. 2 shows a lens film made up of a metallized coating surface 12 on a polymer layer 13 and an adhesive layer 11 attached and mounted on a optical flat 21 on a flat surface 18 suitable for adhesive attachment. Because of the flat surface the light ray 14 is reflected as light ray or bundle 15 at equal angles of incidence and reflection to the metal film surface 12. The reflective metal material is from one of the bright reflective metals or alloys such as aluminum, copper, gold, silver, titanium, inconel, or stainless steel. Although metal foil is used, it is usual and preferable for one of the metals to be vapor-coated or sputtered onto a polymer substrate to form the reflective layer 12. Suitable polymer substrates for sputtering may be made from acrylic polymers, such as acrylate, methacrylate, polyethylene, polypropylene, polyvinylchloride, nylon, and polyesters, such as polyethylene terephthalate, as well as other co-polymers known to those skilled in the art. Such polymeric films 13 are well-known in the art and are commercially available in thickness ranging from less than 0.5 mils to more than 10 mils (1 mil equals 0.001 inch).

Mounting adhesive 11 may be a contact adhesive, such as adhesive tape or pressure sensitive adhesive, or may require water or another solvent to activate or expose the adhesive. Preferably the lens film is furnished with a protective removable layer over the mounting adhesive 11 to prevent unwanted adhesion of the lens film to other objects prior to application to the lens 21.

FIG. 2 also illustrates the effect of a partly transparent reflective metallized surface 12. In this case a portion of the light bundle 14 is reflected as ray 15 and in addition a portion of the light bundle 20 continues through the transparent polymer 13, the transparent adhesive 11, and the lens 21.

Figure 3:
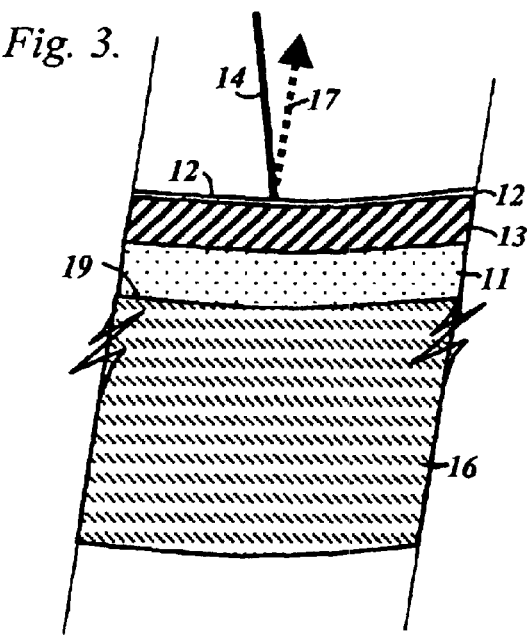
FIG. 3 is an enlarged cross-sectional view of a small portion of the preferred embodiment in accordance with the principles of the present invention, in which the inside surface of a spectacle lens serves as a substrate for the adhesive backing of the reflective conformal lens film.

FIG. 3 shows the reflective metallized surface coating 12 on the polymer film 13 mounted with adhesive layer 11 to a spherical surface 19 of the lens 16. In this case the adhesive 11 conforms to and maintains the spherical surface 19 of lens 16 due to the prior selection of the proper thickness qualities. In this preferred embodiment the reflective surface coating 12 also conforms to the curvature of the spherical surface 19 of lens 16 due to the selection of the proper flexibility qualities. Light from the object is shown as a light ray 14 being reflected as light ray 17 at a steep angle due to the curvature of the reflective surface coating 12 that has been assumed from the underlying lens 16.

EXAMPLES

Example number one is a glasses mounted display that uses a 0.7 inch diagonal 640×480, flat panel display as manufactured by Planar, Inc. mounted on the temple of the glasses set to display 25 lines of text maximum. The concave inside surface of the glasses lens has a radius of curvature of 500 mm. The lens film that is applied to the lens is a 2.5 mil thick bright metallized acrylic backed by 0.6 mil thick 3M No. 320 adhesive. The thickness of the flexible acrylic is selected to conform to the spherical lens shape maintaining an approximate optical surface without bubbles or ripples. The resultant image, equivalent to a 9 inch diagonal measure desktop monitor, is legible with slight distortions.

Example number two is a glasses mounted display that uses an LED watch module with 3.0 mm high digits as manufactured for Radio Shack as #63-5093 mounted on the temple of the glasses. The concave inside surface of the glasses lens has a radius of curvature of 500 mm. The lens film that is applied to the lens is a 2.0 mil thick bright metallized polyester backed by 0.8 thick 3M No. 300 adhesive. The thickness of the flexible acrylic is selected to conform to the spherical lens shape maintaining an appropriate, usable and practicable optical surface without bubbles but with some observed surface irregularities. The resultant numeric image which subtends a vertical angle of 3 degrees is legible without distortions.

What is claimed is:

1. A reflective optical element comprising: an eyeglass lens possessing at least one optically shaped surface, a nasal portion of which is suitable as an adhesive substrate, on which is disposed a lens film positioned within the optical train of a spectacle mounted display and viewer comprising (1) an adhesive layer and backing selected to maintain a uniform thickness when deformed, (2) a metal foil and polymer layer possessing a uniform light reflecting surface and of a thickness selected to be flexible when deformed, wherein said lens film is applied and secured to said lens with pressure and stress to conform to said optically shaped surface and adhere said adhesive backing to said lens substrate.

2. The reflective optical element of claim 1 whereby said lens film is partly transparent.

3. The reflective optical element of claim 2 whereby the image quality of said spectacle mounted display is suitable for the display of a limited quantity of text.

* * * * *